July 31, 1923.

S. PICHLER

TESTING DEVICE

Filed July 26, 1922

1,463,440

Inventor
Stephen Pichler.
By
Attorneys

Patented July 31, 1923.

1,463,440

UNITED STATES PATENT OFFICE.

STEPHEN PICHLER, OF DETROIT, MICHIGAN.

TESTING DEVICE.

Application filed July 26, 1922. Serial No. 577,652.

*To all whom it may concern:*

Be it known that I, STEPHEN PICHLER, a citizen of the United States of America, residing at Detroit, in the county of Wayne and State of Michigan, have invented certain new and useful Improvements in Testing Devices, of which the following is a specification, reference being had therein to the accompanying drawings.

In my Patent No. 1,390,554, granted Sept. 13, 1921, there is disclosed a cam gauge or instrument of precision for testing inaccuracies in cams, eccentrics and other structures or articles having curvilinear surfaces. The gauge or instrument included a plurality of pins adapted to be interposed between the cam and a defined surface, the position of the pins at different places on the surface of the cam indicating whether such surface is true to a predetermined measurement, thus permitting of an artisan ascertaining the accuracy of the cam. When using my gauge or instrument I found the pins to be more or less a handicap or trouble on account of being misplaced, lost or a wrong pin selected for a predetermined measurement. It therefore occurred to me that some means could be used as a substitute for these pins, which would be more practical, therefore I devised a micrometer support which would permit of a micrometer being used for testing the surface of the cam in lieu of the multiplicity of pins. Just as fine measurements can be made with the micrometer and its support permits of it being easily and quickly shifted relative to a cam surface and the grooves or calibrations of my testing device.

My improvement will be hereinafter described by aid of the drawing wherein.

Figure 1:
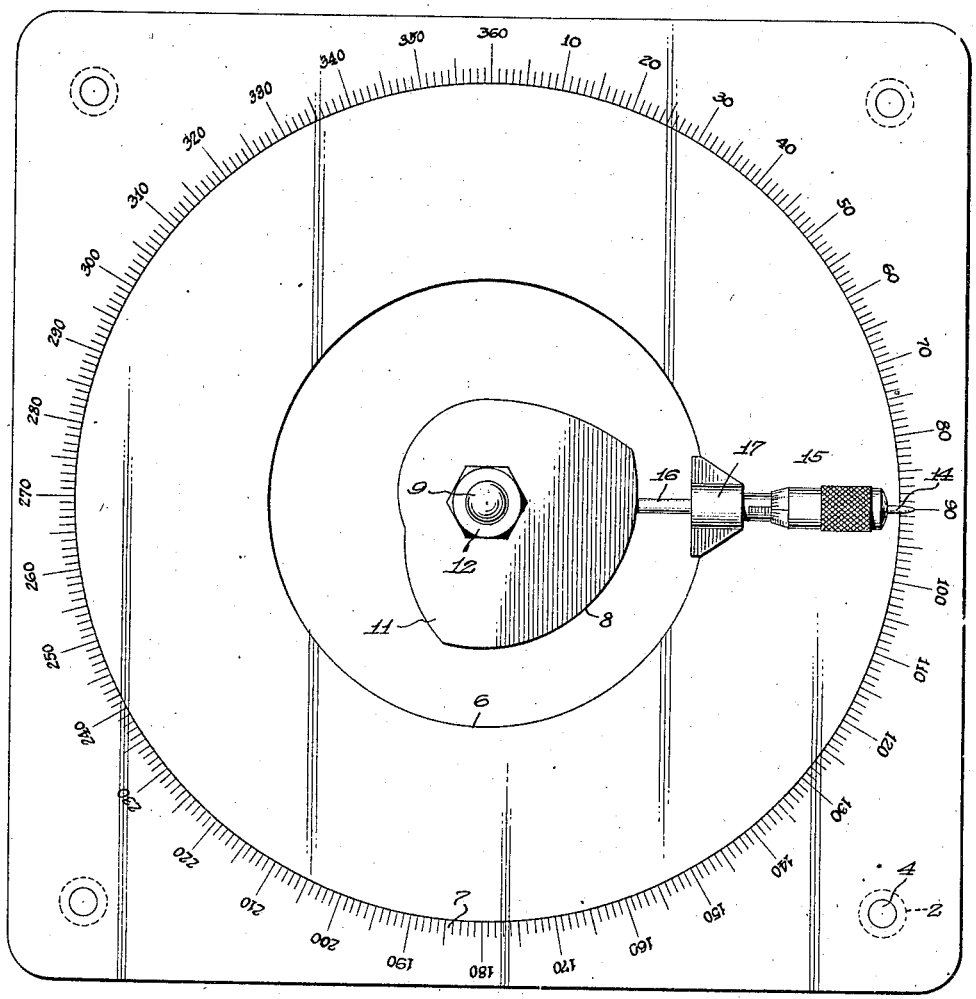
Figure 1 is a plan of the gauge or testing device.
Figure 2:
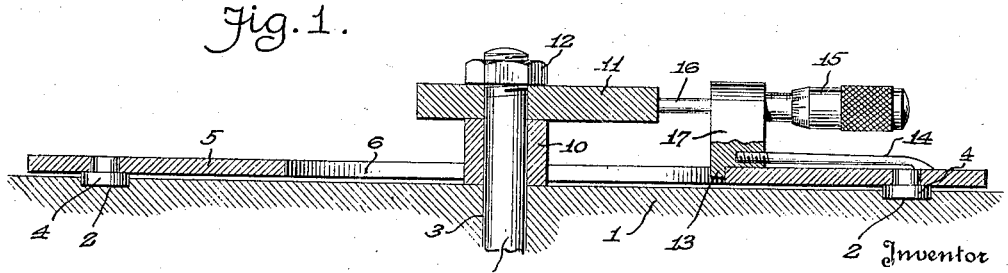
Fig. 2 is a cross sectional view of the same.

As in my former device there is a suitable support 1, as a work bench or horizontal portion of a machine, which is provided with a plurality of sockets 2 having an accurate defined relation to a socket 3. Mounted in the sockets 2 are the feet or pegs 4 of a graduated scale plate 5 having a large central circular opening 6 with the walls thereof perfectly true and smooth. The upper face of the plate 5 may be graduated or calibrated, as in my former device, but for the purpose of explaining this improvement I have simply shown degree graduations 7.

Mounted in the socket 3 is a post or rotary pin 9 provided with an interchangeable collar 10 which bears upon the support 1 and it is on this collar that a cam or other article 11 may be placed, about the post 9, and held by a nut 12 or other holdfast device mounted on the post.

Slidable about the marginal edges of the opening 6 is a support or bracket 17 having a depending ledge or rib 13 extending into the opening 6 and against the wall thereof so that said wall will guide the support or bracket when shifting it on the plate 5. Extending outwardly in a radial direction from the support or bracket 17 is a pointer 14 extending to the degree graduations 7 of the plate 5.

Mounted in the upper end of the support or bracket 17 is a conventional form of micrometer 15 having a pin or adjustable member 16 extending inwardly from the support or bracket 17 in a radial direction to contact with the surface 8 of the cam 11 and by setting the micrometer for a predetermined measurement between the cam surface and the wall 6 the support or bracket 17 can be shifted to a desired degree mark to ascertain if the cam surface, at this particular degree mark, is accurate, relative to the wall 6. If it is not accurate the micrometer can be easily adjusted to ascertain how much out the cam surface may be, and in this manner any inaccuracies in the cam surface can be discovered and either rectified or the cam discarded before it is placed in use.

When the plate 5 is provided with additional graduations I may use the radial finger or member disclosed in my prior patent, and I may use other means, than herein disclosed for supporting the cam or any article in a defined location relative to the plate 5. For this and other reasons I do not care to confine my invention to a construction other than defined by the appended claims.

What I claim is:—

1. Means for ascertaining the inaccuracies of a curvilinear surface on a piece of work comprising a plate having graduations and an opening to receive the piece of work, means for holding the piece of work in a defined position relative to the wall of the plate opening, and means having a constant radial relation to the piece of work and slidable on and circumferentially of the marginal edges of the plate opening, and adjustable to and from the axis of the plate opening adapted to engage the piece of work and permit of an inaccuracy in the piece of work being ascertained, said means including a pointer overlying said plate and movable relative to the graduations thereof.

2. Means for ascertaining the inaccuracies of a curvilinear surface on a piece of work, as called for in claim 1, wherein the last mentioned means inludes a bracket and a micrometer in the upper end of said bracket.

3. Means for ascertaining the inaccuracies of a curvilinear surface on a piece of work, as called for in claim 1, wherein the last mentioned means includes a bracket and an adjustable pin in said bracket.

In testimony whereof I affix my signature in presence of two witnesses.

STEPHEN PICHLER.

Witnesses:
  KARL H. BUTLER,
  ANNA M. DORR.